United States Patent [19]

Haines

[11] 4,018,533
[45] Apr. 19, 1977

[54] OPTICAL INSTRUMENT EMPLOYING RETICLE HAVING PRESELECTED VISUAL RESPONSE PATTERN FORMED THEREON

[75] Inventor: Richard F. Haines, Los Altos, Calif.

[73] Assignee: The United States of America as represented by the Administrator of the National Aeronautics and Space Administration, Washington, D.C.

[22] Filed: Mar. 8, 1976

[21] Appl. No.: 665,032

[52] U.S. Cl. .............................................. 356/171
[51] Int. Cl.² ...................................... G02B 27/32
[58] Field of Search ............ 356/171, 251; 354/225

[56] References Cited

UNITED STATES PATENTS 2,217,930  10/1940  Zimmerman ...................... 354/225
3,094,579  6/1963  Papke ................................ 354/225

Primary Examiner—John K. Corbin
Assistant Examiner—Richard A. Rosenberger
Attorney, Agent, or Firm—Darrell G. Brekke; John R. Manning

[57] ABSTRACT

An optical instrument for use in locating indicator lights or the like on a work surface comprises a tubular housing, a lens mounted within the housing and including an inner surface coated with a dichroic material that is capable of reflecting a portion of the light incident thereon, a plate mounted within the housing opposite the lens and having a central aperture, a transparent substrate disposed within the housing intermediate the lens and the plate, the substrate including a first surface disposed in a facing relationship to the dichroic material, and a reticle formed on the first surface and comprised of a material capable of reflecting light, the reticle including a reference pattern and a plurality of contours each representing an iso-response time for an average viewer to respond to a light of a preselected color, whereby when the aperture is placed in front of the eye of a viewer ambient light passing through the lens and striking the reticle is reflected from the reticle against the coating which in turn reflects a portion of the light through the substrate and the aperture into the eye, and whereby the reference pattern and the contours appear to be projected upon the work surface so as to permit the viewer to locate indicator lights on the work surface such that the lights are capable of being observed and hence responded to within a desired response time.

12 Claims, 7 Drawing Figures

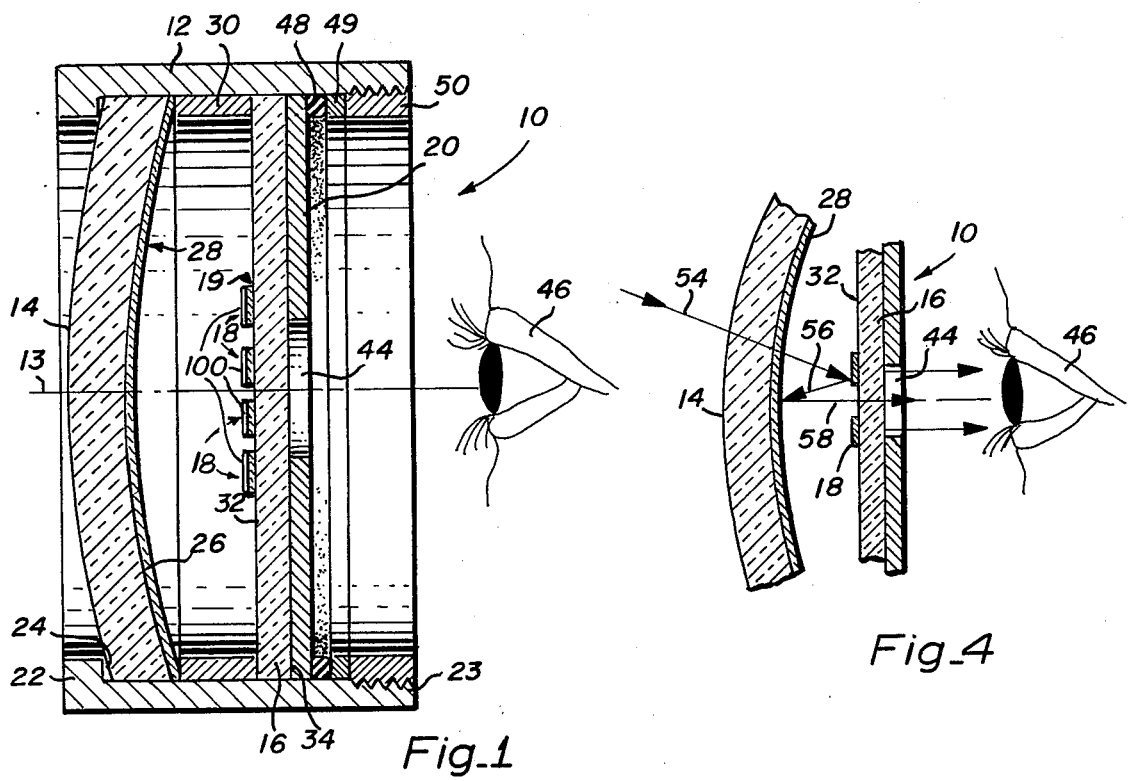
Fig_1
Fig_4
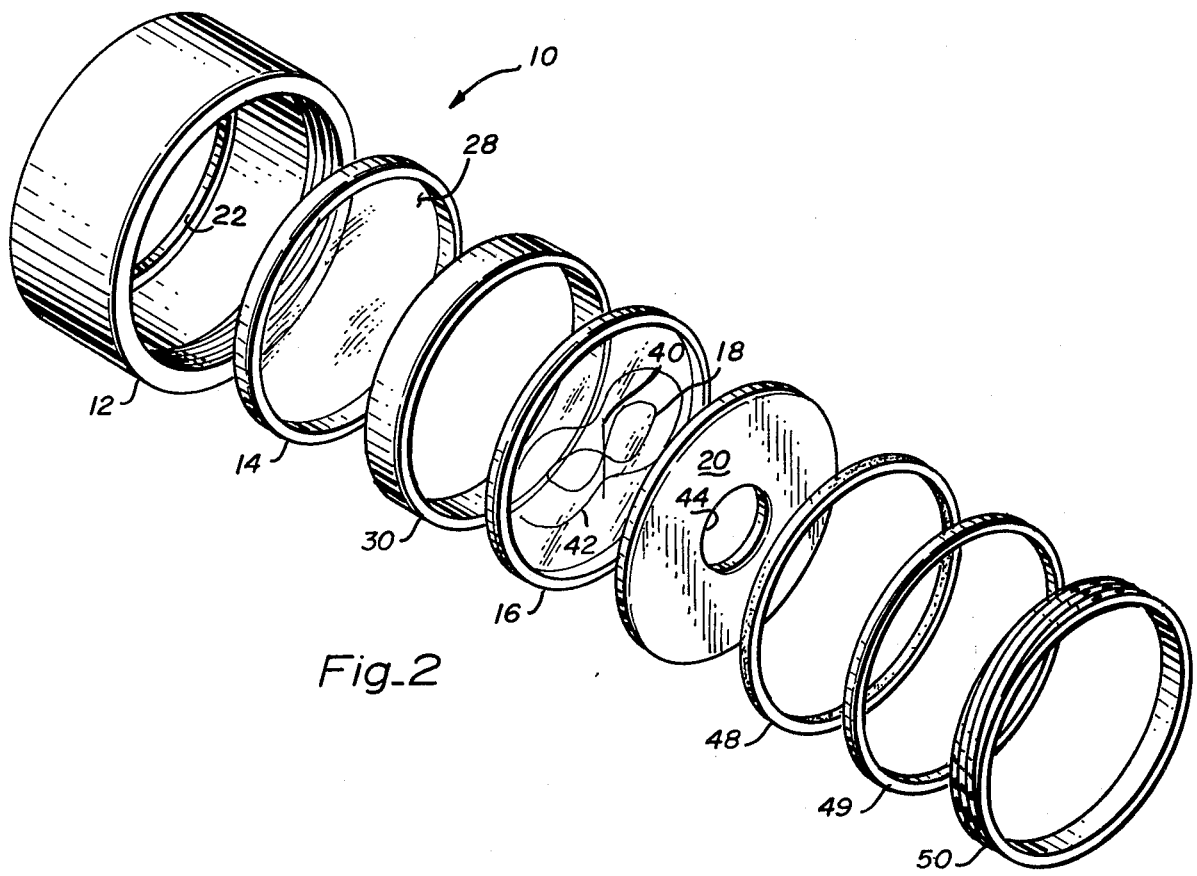
Fig_2

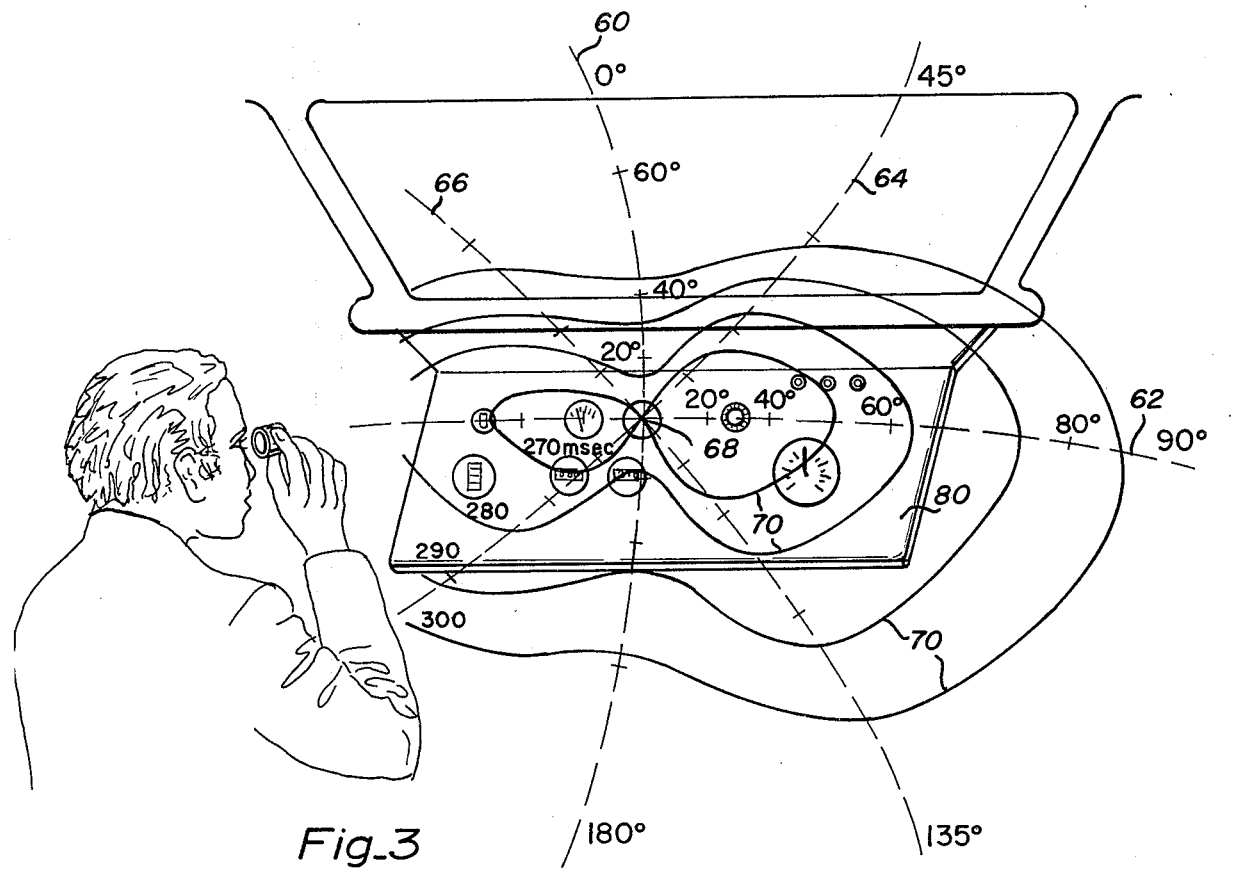
Fig_3
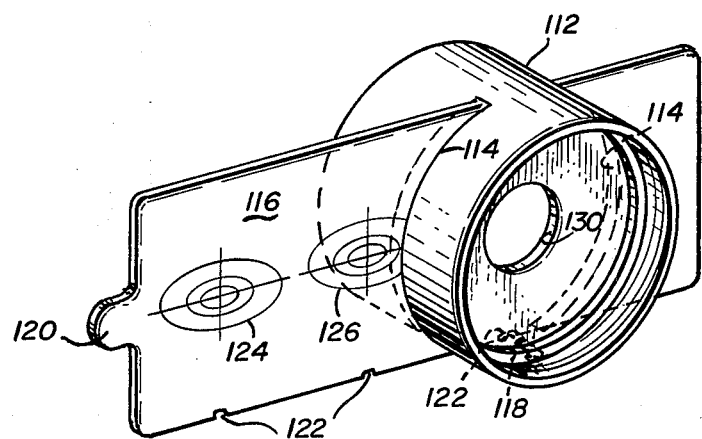
Fig_7

OPTICAL INSTRUMENT EMPLOYING RETICLE HAVING PRESELECTED VISUAL RESPONSE PATTERN FORMED THEREON

The invention described herein was made by an employee of the United States Government and may be manufactured and used by or for the Government for Governmental purposes without the payment of any royalties thereon or therefor.

BACKGROUND OF THE INVENTION

1. Field of the Invention

The present invention relates generally to optical instruments and, more particularly, to optical instruments employing a reticle having a reference pattern and a plurality of contours each representing an iso-response time for an average viewer to respond to a light of a preselected color for use in laying out the location of visual indicators on a work surface.

2. Description of the Prior Art

Heretofore, very little data has been available regarding the length of time it takes for a person to respond to colored stimuli imaged in the peripheral visual field. As a consequence, equipment designers have been required to design and lay out instrument and control panels through laborious time consuming procedures which only indirectly take human response time into account. For example, instrument panel designers who must locate warning lights in aircraft cockpits and the like have placed such lights in conventional places without necessarily considering the optimum location so as to most likely to elicit the fastest visual detection and manual response.

Examples of prior art, optical instruments employing reticles are found in U.S. Pat No. 2,500,405,"Reticle Mount," M.N. Fairband and U.S. Pat. No. 3,446,561, "Passive Bright Pattern Reticle," G.R. Griffin et al. None of these patents reveal optical instruments having a reticle which is particularly formed for use in designing panels on which warning lights are located such that the lights are capable of being observed and responded to as rapidly as possible.

SUMMARY OF THE PRESENT INVENTION

It is therefore a primary object of the present invention to provide a hand-held optical instrument for use by panel layout designers and other design professionals which permits indicator lights or the like to be located on the panel in such a location that their retinal images fall in areas which are known to elicit a desired response time on the average and which is lightweight, rugged and does not consume power.

Still another object of the present invention is to accomplish the previously stated object by providing a reflective reticle including a reference pattern and a plurality of contours each representative of a given iso-response time for an average viewer to respond to a light of a preselected color.

Briefly, the preferred embodiment includes a generally tubular housing having first and second ends, a lens mounted within the housing proximate the first end, the lens including an inner surface coated with a dichroic material that is capable of reflecting a portion of the light incident thereon and which serves as a concave mirror surface, a plate mounted within the housing proximate the second end and having a central aperture, a generally transparent substrate disposed within the housing intermediate the lens and the plate, the substrate includng a first surface disposed in a facing relationship to the dichroic material, and a reticle formed on the first surface and comprised of a material capable of reflecting light, the reticle including a reference pattern and a plurality of contours each representing an iso-response time for an average viewer to respond to a light of a preselected color, whereby when the aperture is placed in front of the eye of a viewer, ambient light passing through the lens and striking the reticle is reflected from the reticle against the coating which in turn reflects a portion of the light through the substrate and the aperture into the eye, and whereby the reference pattern and the contours appear to be projected upon the work surface so as to permit the viewer to locate indicator lights on the work surface such that the lights are capable of being observed and hence responded to within a desired response time.

Among the advantages of the present invention are that it is lightweight, rugged, compact, does not consume power and allows an operator to optimize the design of an instrument panel having warning and other visual indicators in accordance with selected human visual capabilities.

These and other objects and advantages of the present invention will no doubt become apparent to those of ordinary skill in the art after having read the following Detailed Description of the Preferred Embodiments which are illustrated in the several figures of the drawing.

IN THE DRAWING

FIG. 1 is a schematic illustration generally illustrating the principal components of an optical instrument in accordance with the present invention;

FIG. 2 is an exploded perspective view further illustrating the optical instrument shown in FIG. 1;

FIGS. 3 and 4 are diagrams generally illustrating the operation of the optical instrument shown in FIG. 1;

FIG. 7 is a schematic illustration of an alternative embodiment of the present invention.

DETAILED DESCRIPTION OF THE PREFERRED EMBODIMENTS

Figure 5:
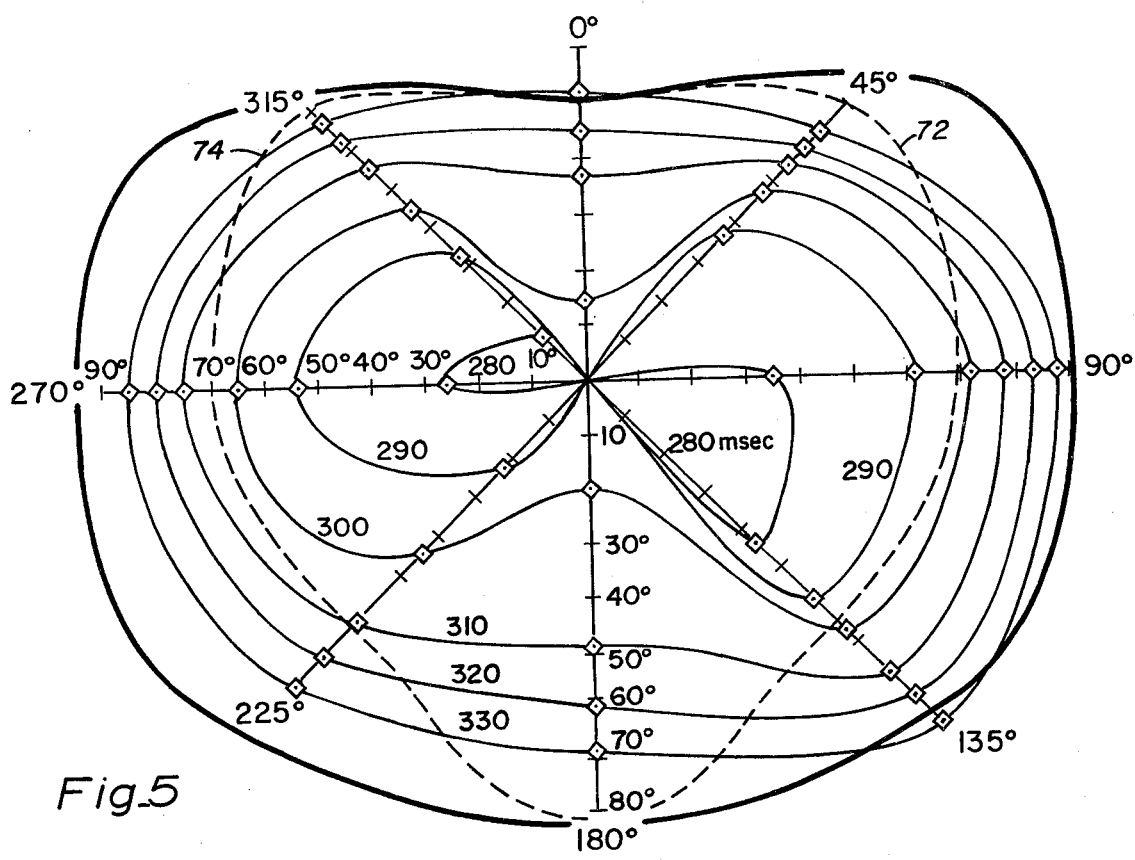
FIGS. 5 and 6 illustrate the iso-response time zones for the binocular visual field for stimuli of two different colors.

Referring now to FIGS. 1 and 2 of the drawings, an optical instrument 10 in accordance with the present invention is illustrated diagrammatically and in an exploded view. The instrument 10 comprises a housing 12, a lens 14, a substrate 16, a reticle 18 and a field stop plate 20.

The housing 12 has a generally tubular shape with an end terminating in an annular lip 22. Its inner surface proximate the end 23 is threaded to facilitate coaxially mounting the several members, relative to an axis 13, as will be subsequently described. In the preferred embodiment, the housing is formed from aluminum material and has an inner diameter of about 3.5 cm.

The lens 14 is mounted within the interior of housing 12 with its convex outer surface 24 abutting the lip 22. Its concave inner surface 26 is coated with a thin layer 28 of partially reflective dichroic material such as magnesium fluoride. The lens 14 which acts as a concave mirror serves to reflect incident natural light in a collimated fashion into the eye of a viewer from the plane of the reticle. It has been found that collimated reflected light rays reduce eye fatigue associated with visual accommodation of the reticle pattern. Alternatively, other appropriate wavelength-selective coatings or dichroic material can be used.

In the preferred embodiment the lens 14 has a diameter of about 3.42 cm. and an effective focal length of about 8.89 cm., which is about 2.6 times the diameter.

A spacer ring 30 is mounted within the housing 12 in an abutting relationship with the inner surface 26 of the lens 14 and serves to maintain the lens 14 against the lip 22 and to provide a predetermined separation between the lens 14 and the substrate 16. In the preferred embodiment, the spacer ring is formed from aluminum and has a longitudinal dimension of about 8,8 mm.

The substrate 16 is a disk-shaped body formed of clear material and having parallel surfaces 32 and 34, respectively. The substrate 16 is mounted within the housing perpendicular to the axis 13 with its surface 32 against the spacer ring 30. In the preferred embodiment the substrate is formed from glass.

The reticle 18 is formed on the central portion of the inner surface 32 from a reflective material such as the dichroic material magnesium fluoride coated over a fully reflective coating 19 such as aluminum oxide. In the preferred embodiment the reticle 18 is photolithographically deposited on the surface 32 and comprises one or more thicknesses of magnesium fluoride in one-quarter wavelength thicknesses 100 over a coating 19 of aluminum oxide. Use of several thicknesses of dichroic material 100 acts as a selective interference filter. Alternatively, the coating 19 can be a fully reflective coating of aluminum oxide, or even inconel steel used alone. The reticle 18 can also be formed by electrostatic plating or by silk-screening techniques.

Figure 6:
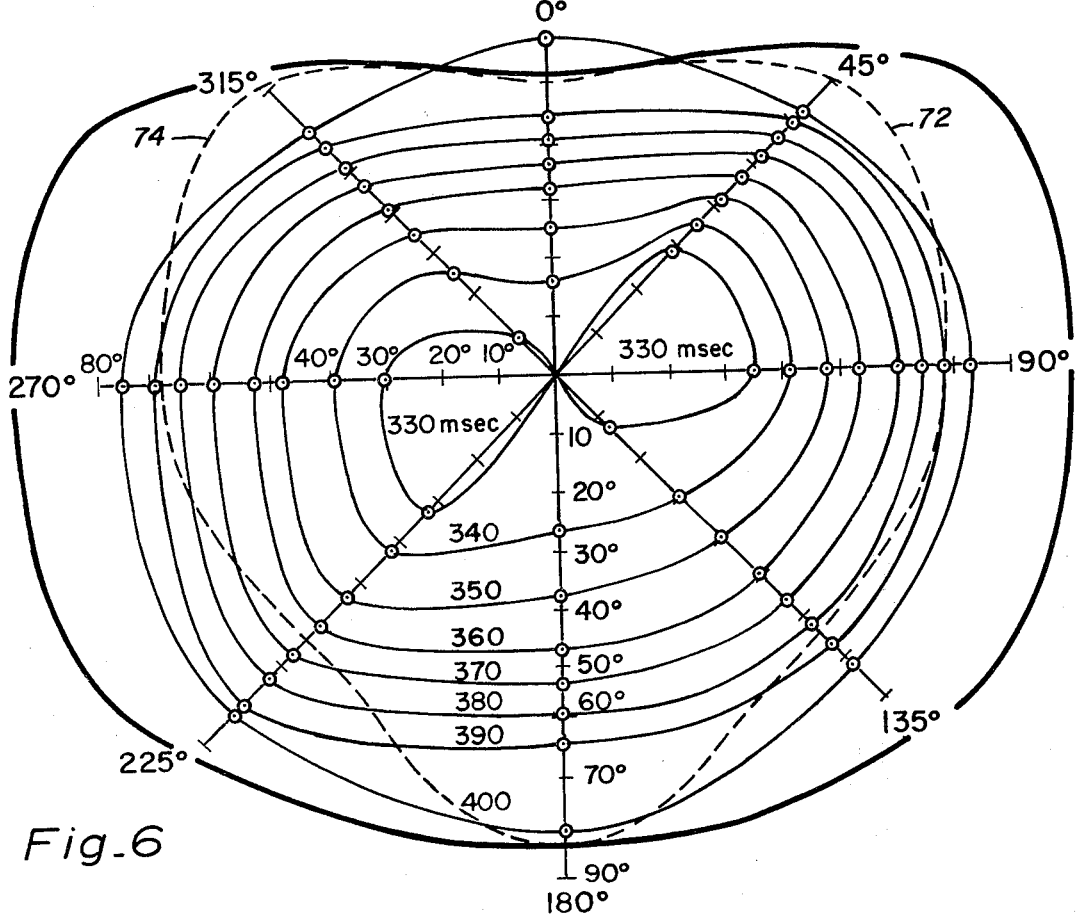

The reticle 18 comprises a reference pattern 40 and a plurality of contours 42 (see FIGS. 3, 5, and 6). Each of the contours 42 represents an iso-response time for an average or normal person to respond to a light of a certain color. Examples of a few of such reticles are illustrated in FIGS. 3, 5, and 6 and will be subsequently described in more detail. Since the reticle 18 is centrally located near the axis 13 the outer portion of the surface 32 and those portions not covered with the reticle remain clear and hence are transparent to light. The reticle 18 serves to reflect light impinging on the surface 32 toward the dichroic material 28 while the substrate 16 serves to pass light without reflection. The use of dichroic material allows several different colored reticle patterns to be seen through the instrument simultaneously.

The field stop 20 or plate is comprised of an opaque disk having a central aperture 44 of a predetermined diameter and is disposed near the end 23 in an abutting relationship to the surface 34. The diameter of the aperture serves to control the size of the field of view observed when a viewer aims the instrument at a work surface with his eye against the aperture 44 in the plate 20. The viewer's eye is illustrated in FIG. 1 and designated by the numeral 46. In the preferred embodiment, the plate is comprised of metal, the aperture has a 1.5 cm. diameter, and the field of view is limited to about 45° arc diameter.

An 0-ing 48, preferably made out of rubber material, abuts the outer periphery of the field stop 20 and serves to seal the interior of the housing from moisture. A compression ring 49, preferably formed out of metal, and a threaded retainer ring 50 which mates with the threads on the inner surface of the housing 12 serve to fixedly secure the elements within the housing.

In operation as shown in FIG. 4, the viewer holds the instrument 10 with the aperture 44 close to his eye and the lens 14 aimed at a work surface. Ambient light represented by the numeral 54 entering the housing 12 through the lens 14 falls on the surface 32 of the substrate 16. A portion of this light 56 that strikes the reticle 18 is reflected and caused to strike the layer 28. In turn the layer 28 reflects a portion of this light indicated by the line 58. Because of the concave shape of the surface 26 and because the reticle lies at the focal plane, the light 58 is collimated and caused to pass along or parallel to the axis 13, through the substrate 16 and aperture 44 to the eye of the viewer.

Since those portions of the substrate not covered by the reticle are clear, it appears to the viewer that the pattern formed by the reticle is projected out onto the work surface.

The reticles are illustrated in FIGS. 5 and 6. As shown in FIG. 3, a response to white light signals of an average observer projected on a complex work surface and created by a reticle formed in accordance with the present invention is illustrated. Turning now to FIGS. 5 and 6 the reticles each comprise a vertical reference line 60, a horizontal reference line 62, and two diagonal reference lines 64 and 66 which intersect at a common center reference point 68. The vertical reference line 60 extends along the 0° — 180° meridians; the horizontal reference line 62 extends along the 90°, 270° meridians; the reference line 64 extends along the 45° – 225° meridians; and the reference line 66 extends along the 135° – 315° meridians. In addition, the reticle comprises a plurality of generally concentric, lazy-eight shaped contours 70. Each contour 70 represents the boundary of equal retinal response time to a light of preselected color.

With reference first to FIG. 3, the response to the color white, includes an inner contour designated as 270 milliseconds (msec.) followed by 280, 290 and 300 msec. contours. The contours represent the mean or average response time to a white-colored, 45 minute arc diameter stimuli flashed upon each of 72 retinal locations on a dark-adapted binocular retina. This data constitutes a substantially complete map of the color response time zones of the normal retina.

In obtaining the data, each 50 msec. duration flash appeared at an unexpected location within a given one of the eight previously listed meridians and at an unexpected time. The interflash intervals were randomized with the mean time between flashes being 2.2 seconds. The mean age of the seven observers was 24 years and such observers were highly practiced prior to collecting the data. The white stimuli possessed a luminance of $2.29 \times 10^{-5}$ cd/cm$^{-2}$ (approximately 1.3 $\log_{10}$ unit above absolute light threshold). The visual fixation is at the center of the polar coordinate plot. With reference to FIGS. 5 and 6 each heavy black line encircling the contours represents the limit of the binocular field of view for these observers.

In FIGS. 5 and 6 reticles for a blue stimuli and a red stimuli are shown. The dashed line 72 on the right-hand side of the 0° – 180° meridian represents the left eye's field of view limit on the nasal side. The left eye's field of view on the temporal side is, of course, the same as the solid line (i.e., the binocular field of view limit that extends left of such meridian). The right eye's field of view limit on the nasal side is represented by the dashed line 74 on the left-hand side of the meridian and its temporal field of view limit is the same as the binocular field of view limit extending to the right of the 0°–180° meridian. The number by each contour indicates the mean response time for the contour in milliseconds. As shown, these iso-response contours have been arbitrarily spaced 10 msec. apart.

The two "lobes" of minimum response time shown in these figures (280 msecs. for blue light and 330 msec. for red light) indicate that an observer is able to respond much quicker to a blue light than to a red light. Moreover, since the minimum contour for white light is 270 msec. (see FIG. 3), the observer can respond slightly faster to a white light than a blue light. Care was taken to adjust all of the test colors to equal brightness before testing. These lobes are also of interest and of possible practical importance since they appear to correspond to the pair of central lobes relative to the absolute achromatic retinal sensitivity in the monocular field of view. The binocularly produced response time lobes may represent an increased sensitivity in one eye to compensate for the physiological blind spot in the other eye. A more complete description of the tests used to develop the reticle patterns is found in "Response Time To Colored Stimuli In The Full Visual Field" by Richard F. Haines et al, NASA Technical Note, NASA TN D-7927, (March, 1975), and the teachings of such document are incorporated by reference herein.

It should be recognized that the reticles each correspond to a polar plot for the binocular field of view for a respective stimuli. Although polar plots for blue and red stimuli are illustrated, it should be noted that similar plots for white, yellow and green stimuli have been developed and are included in the above-referenced NASA Technical Note, NASA TN D-7927. From the polar plots a work surface can be designed as will be subsequently described. Because the peripheral visual sensitivity data represent retinal field response capabilities, such data remains spatially fixed with respect to the entire retinal plane. Nevertheless, it should be understood that such data may be considered to be "projected" upon the real world scene during a visual fixation.

Referring again to FIG. 3, the projection of a reticle including a pattern of the response of an average observer to a white light is illustrated as being projected on a complex work surface 80 such as an aircraft cockpit. The work surface 80 of a typical commercial aircraft is schemmatically illustrated with the polar coordinate response time data for white stimuli centered on one of the pilot's flight instruments. It should be recognized that the meridian lines are slightly curved because the hemispheric arc that the iso-response time contours represented is being viewed from a point several feet to the right and above the pilot's eye position. Nevertheless, it should be clear how such projections of the polar plots described herein upon the work surface can aid in positioning warning lights and other visual indicators so as to yield the most rapid detection and manual response.

The projection illustrates that the retina tends to be organized such that horizontally-oriented, generally oval regions mediate common visual detection responses. Knowledge of this fact by display layout designers enables them to select optimum panel locations for the various instruments, e.g., and by taking into account the typical, or anticipated, eye scan behavior of the operator and the other human factor principles of design.

Because of the importance of grouping the flight instruments so that they require minimal eye scan distance, it is necessary to prioritize all of the panel instruments, visual warning lights, manual controls, and other information sources so that they may be optimally positioned within the pilot's field of view. By "optimal position" is meant that particular location within the field of view that yields the highest probability of visual detection and also fastest manual response without having to refixate the instrument in question.

FIG. 3 serves to illustrate the approximate amount of button-pressing response time that can be saved by moving a selfluminous indicator a matter of even 10° arc from its former position. Savings of 10–20 msec. may seem insignificant until these short durations are translated into distance traveled at typical jet aircraft landing (or takeoff) speeds. For instance, at 140 knots, an aircraft will travel 2.88 meters (9.46 ft) in 40 msec. When distance traveled is calculated for a typical response time, an aircraft will travel 21.62 meters (70.94 ft) in 300 msec., at 140 knots.

In an alternative embodiment illustrated in FIG. 7 the instrument includes a tubular housing 110 which may be similar to the housing illustrated in FIG. 2. The fundamental difference between housings is that the housing 112 includes a pair of opposed slots 114 which serve to slideably receive a reticle plate 116. In addition, a detent spring 118 (shown in dashed lines) is rigidly secured to the housing in order to permit the plate 116 to be positioned at a preselected location within the housing as will be subsequently described. The reticle plate 116 is formed from a clear plastic material, has a generally elongated rectangular shape and includes a tab 120 protruding from one of its sides and a plurality of indents 122 along its bottom surface. The indents 122 are adapted to be engaged by the detent spring 118 so as to lock the plate 116 at a preselected location within the housing. Two separated reticle patterns 124 and 126 are formed on a face of the plate 116. The patterns 124 and 126 include substantially identical reference patterns and a set of a plurality of contours. Each set represents given iso-response times for an average viewer to respond to a stimuli of a preselected color. For purposes of simplicity only two patterns are illustrated. However, it should be recognized that more patterns can be included by merely increasing the length of the plate.

In operation, the viewer grasps the tab 120 and pushes the plate 116 through the slots 114 until the preselected reticle pattern is in alignment with the aperture 130. Alignment is assured when the detent spring 118 engages the apppropriate indent 122. Functionally, the instrument operates as previously described. The seveal reticles enable the viewer to simply and sequentially observe the response of an average person to different color stimuli.

In still another embodiment, a small battery-operated light source is included within the housing to illuminate the reticle in darkened environments.

From the above it will be seen that there has been described an instrument employing a reticle that enables a layout designer to properly select the color and position of a luminous display on a work surface where it is most likely to evoke the most rapid visual detection and manual response.

While the invention has been particularly shown and described with reference to certain preferred embodiments, it will be understood by those skilled in the art that various alterations and modifications in form and detail may be made therein. Accordingly, it is intended that the following claims cover all such alterations and modifications as fall within the true spirit and scope of the invention.

What is claimed is:

1. An optical instrument for use in locating indicator lights on a work surface comprising:
   a generally tubular housing having first and second ends;
   a lens mounted within said housing proximate said first end, said lens including an inner surface coated with a material that is capable of reflecting a portion of the light incident thereon;
   a plate mounted within said housing proximate said second end and having a central aperture;
   a generally transparent substrate disposed within said housing intermediate said lens and said plate, said substrate including a first surface disposed in a facing relationship to said coated inner surface; and
   a reticle formed on said first surface and comprised of a material capable of reflecting light, said reticle including a reference pattern and a plurality of contours each representing an iso-response time for an average viewer to respond to a light of a preselected color, whereby when said aperture is placed in front of the eye of a viewer, ambient light passing through said lens and sriking said reticle is reflected from said reticle against said coated inner surface which in turn reflects a portion of the light through said substrate and said aperture into the eye, and whereby said reference pattern and said contours appear to be projected upon the work surface so as to permit the viewer to locate indicator lights on the work surface such that the lights are capable of being detected and hence responded to within a desired response time.

2. An optical instrument as recited in claim 1 wherein said reference pattern includes first and second orthogonal lines that intersect at a reference point and that are capable of being projected in a generally horizontal and in a generally vertical direction, respectively, on said work surface.

3. An optical instrument as recited in claim 2 wherein said reference pattern further includes third and fourth intersecting lines that pass through said reference point and extend diagonally relative to said first and second lines.

4. An optical instrument as recited in claim 1 wherein said plurality of contours are generally concentric.

5. An optical instrument as recited in claim 1 wherein said inner surface is generally concave, and said substrate is generally planar whereby said inner surface serves to reflect a collimated beam of light through said aperture.

6. An optical instrument as recited in claim 5. wherein said first lens has an effective focal length that is about 2.6 times its diameter.

7. An optical instrument as recited in claim 1 wherein said reticle is deposited on said first surface.

8. An optical instrument as recited in claim 1 wherein said aperture provides a field of view of the viewer of about 45° arc diameter.

9. An optical instrument as recited in claim 1 wherein said housing includes means for receiving said substrate such that said substrate is capable of slideable movement therein, and wherein said substrate includes at least two reticles formed thereon, whereby a preselected reticle can be moved into alignment with said aperture 10. An optical instrument as recited in claim 9 wherein each reticle includes an identical reference pattern and a set of contours, each set representing an iso-response time for an average viewer to respond to light of a preselected color.

11. An optical instrument as recited in claim 10 wherein said contours comprising each said set are generally concentric.

12. An optical instrument as recited in claim 9 wherein said substrate includes a plurality of indents, each associated with a respective reticle, and wherein said housing includes a detent spring capable of engaging one of said indents when said preselected reticle is aligned with said aperture, whereby when said detent spring engages said indent, said reticle is locked in alignment.

* * * * *